United States Patent [19]

Hozer

[11] Patent Number: 4,710,279
[45] Date of Patent: Dec. 1, 1987

[54] METHOD AND BATH FOR ELECTRO-CHEMICALLY RESHARPENING OF CUTTING TOOLS

[76] Inventor: Norman R. Hozer, 2085 Brookfield Dr., Thousand Oaks, Calif. 91362

[21] Appl. No.: 20,510

[22] Filed: Mar. 2, 1987

[51] Int. Cl.⁴ .............................................. C25F 3/00
[52] U.S. Cl. ............................ 204/129.55; 204/129.9
[58] Field of Search ............ 204/129.55, 129.9, 129.95

[56] References Cited

U.S. PATENT DOCUMENTS 2,868,705  1/1959  Baier ................................. 204/129.9

Primary Examiner—T. M. Tufariello
Attorney, Agent, or Firm—Jack C. Munro

[57] ABSTRACT

A method and bath for electro-chemically resharpening of a metallic cutting tool wherein the bath is composed of an aqueous solution of phosphoric acid and sulphuric acid to which is added the stabilizers of chromic acid, nickel carbonate and ferric oxide. An electrical potential is applied to the cutting tool within the bath within the range of one-half volt to six volts for a period of between one and twenty minutes depending upon the type of part (size and construction) that is being resharpened. Preferred temperature of usage for the bath will be approximately seventy-five degrees Fahrenheit.

5 Claims, 2 Drawing Figures

METHOD AND BATH FOR ELECTRO-CHEMICALLY RESHARPENING OF CUTTING TOOLS

BACKGROUND OF THE INVENTION

The field of this invention is related to electro-chemistry and particularly to the electro-chemical milling of metallic parts.

The use of cutting tools, such as drills, routers, reamers and the like, are in extensive widespread usage. A typical cutting tool is sharpest when initially purchased. The shape of the cutting edge has been pre-established at the factory and is honed to be as sharp as possible. This cutting tool is then utilized at a finished stage of production. As the tool dulls, the tool is then utilized at a final roughing out stage. When the tool further dulls it is then moved to be utilized at an initial roughing out stage which is frequently termed "hogging". When the tool becomes unusable at this stage, the tool is either discarded or resharpened.

Such tools are reasonably expensive. If a tool can be resharpened and reused, generally that would be the most economical course of action. Generally, this resharpening costs approximately one-half the initial cost of the tool. This resharpening is accomplished manually utilizing a grinding technique. There are machinists that specialize in resharpening of tools.

The resharpened tool is normally used at the finishing stage. As the tool dulls, it is then moved to the "hogging" out stage. Resharpening significantly extends the life of the tool.

There are certain disadvantages to this manually resharpening of tools. The first disadvantage is that it is a reasonably expensive operation. The second disadvantage is that it is time consuming and normally requires that the tool is shipped to an outside location from its point of usage and is gone for a period of time during which it is resharpened. The third disadvantage is that the resharpening technique is accomplised frictionally. As a result, a significant amount of material is removed from the tool. If the tool is cylindrical, the diameter of that tool is significantly reduced, generally in the range of three to five percent. Because of the amount of material that is being removed, the tool can only be resharpened a few times before it becomes non-usable.

Previously, electro-chemical milling is well-known and comprises the removal of material from the surface of a metal piece by the application of an electrical potential in the presence of a conductive electrolyte. This electrical chemical milling process is particularly well suited to imparting a smooth finish to parts having surface irregularities. In the past, electrical chemical milling has been utilized to deburr a manual or mechanically sharpened edge, or in certain instances actually creating a sharpened edge on a cutting tool. This process has found itself well suited for resharpening of a file and in certain instances it has been utilized to sharpen a cutting edge when utilized in conjunction with a protective film applied to a portion of the tool that is being resharpened. However, prior to the present invention it is believed that it has not been known to utilize the electro-chemical process solely for resharpening cutting edges.

SUMMARY OF THE INVENTION

The structure of the present invention has to do, in part, with the arriving at a particular composition of electrolyte bath. It has been found that, if an aqueous solution of phosphoric acid and sulphuric acid be utilized, a desirable bath composition is obtained. In order to insure stability of the bath between usages, it is necessary to apply stabilizers in the form of chromic acid, nickel carbonate and ferric oxide. The bath primarily is to be used at room temperature, but the bath can be increased in temperature and therefore decreasing the time of usage that is required to resharpen a cutting edge. An important consideration is to minimize the electrical potential that is applied between the cutting tool and the bath. If this electrical potential exceeds a certain level, the edge of the cutting tool will assume a rounded configuration rather than a sharpened configuration. Generally, a desirable level for the electrical potential should be between one-half volt and six volts. The amount of time that is required to effect the resharpening procedure is dependent upon the type of material used and the physical size of the part that is utilized as well as the number of parts that are located within the bath at the same time. Generally, it is very rare that the sharpening time will ever exceed twenty minutes.

The primary objective of the present invention is to utilize a method and bath for electro-chemically resharpening of a metallic cutting tool thereby eliminating the need for mechanical or manual resharpening.

Another objective of the present invention is to utilize an electro-chemical resharpening method which resharpens tools near their initial sharpened state thereby permitting the tools to again be utilized at a finish stage of usage.

Another objective of the present invention is to utilize an electro-chemically sharpening process wherein the amount of material removed from the tool is significantly less than what is removed by mechanical or manual resharpening thereby permitting the tool to be resharpened a substantial number of times over that which was previously possible by the mechanical and manual methods of resharpening.

Another objective of the present invention is to utilize an electro-chemical resharpening process which permits cutting tools to be resharpened in a short period of time and at a cost significantly less than conventional mechanical or manual resharpening.

Another objective of the present invention is to provide a method of resharpening of a cutting edge wherein complexity of the cutting edge is immaterial so that a complex cutting edge can be sharpened as easily as a simple form of cutting edge.

Another objective of the present invention is to accomplish resharpening of tools by relatively unskilled labor.

DETAILED DESCRIPTION OF THE SHOWN EMBODIMENT

Figure 1:
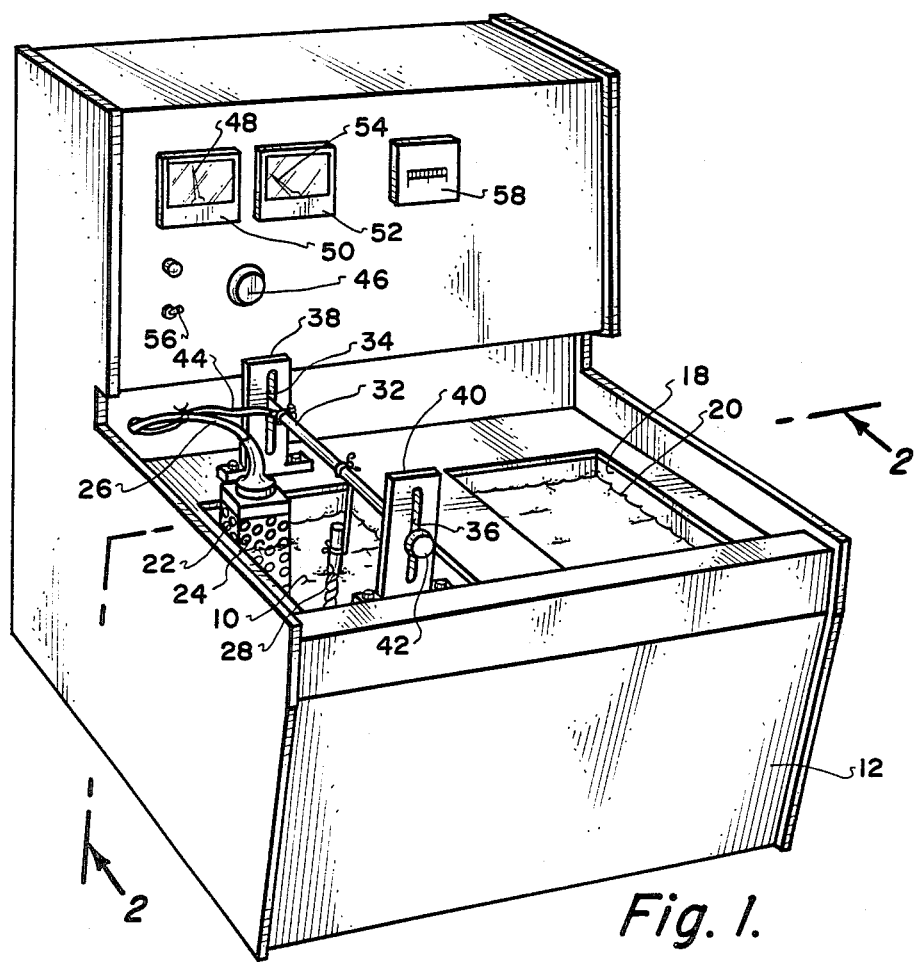
FIG. 1 is an isometric view of a form of apparatus within which is utilized a bath of the present invention in order to achieve resharpening of cutting tools.
Figure 2:
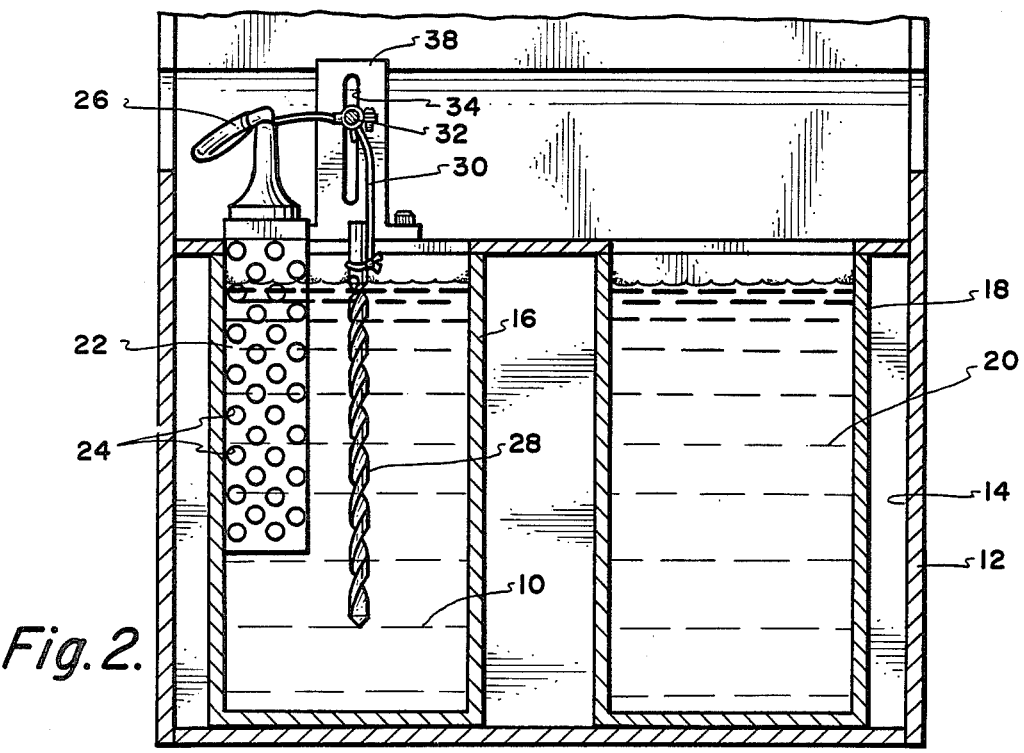
FIG. 2 is a cross-sectional view taken along line 2—2 of FIG. 1.

Previously, when electro-chemical milling was applied to a sharpened surface, such as a knife blade, it was known that the surfaces of the sharpened edge eroded to some extent, but the erosion would tend to become more concentrated at the point of the sharpened edge. As a result, inherently with electro-chemical milling, a greater erosion occurred at the point of the edge than at the side surfaces of the edge. Therefore, electro-chemical milling would inherently produce a rounded edge as opposed to a sharp edge.

Applicant discovered that with a certain composition of electrolyte bath, and if the electric potential was used at low levels, that even erosion would occur across the side surfaces of a cutting edge. No concentration of the erosion would occur at any given point. The net effect is that with a dull edge, which is where the sharpened edge has assumed a slightly rounded configuration, the side surfaces of the edge will be eroded away evenly substantially eliminating the rounded cutting edge and reproducing the initially established sharp edge. The initial geometry of the side surfaces of the cutting edges are maintained.

Maintaining of the initially established cutting edge within certain types of tools is important in order to achieve maximum cutting efficiency during usage. Frequently, during manual or mechanical resharpening, the initially established geometry of the cutting edge is altered. Within the present invention, the initially established geometry is maintained.

The using of electro-chemical milling in order to sharpen an edge has many advantages. Some of these advantages have been previously discussed. Another advantage has to do with when any edge is frictionally formed to be sharpened there are apt to be metallurgical changes involved due to heat and pressure causing loss of temper in some cases, brittleness and chipping in others and/or burring. In stainless steel, these problems are especially severe as stainless steel tends to drag to feather edges which then must be removed without dulling the edge. This type of feathering process involves a slow and expensive honing process to achieve the desired sharp edge. Using of an electro-chemical sharpening process eliminates all of these difficulties.

The electrolyte bath of the present invention can be utilized with a wide range of alloys. If polarization occurs, which is common with carbides, there is created a resistance on the surface of the edge which interferes with the current path between the cathode and the tool. To overcome this, it is necessary to remove the tool from the bath and rinse the tool in water. The hydrogen in water depolarizes the tool. The tool is then reinserted within the bath for completion of the electro-chemical milling process.

When using a bath of the present invention in conjunction with stainless or other types of carbon heat treated steel, it may be desirable to add copper sulphate in the amount of approximately two grams per liter as an added stabilizer. The use of the copper sulphate further stabilizes the bath which seems to be necessary in conjunction with carbon heat treated steels.

It will normally be desirable to replace consumed salts after a multitude of usages of the bath of the present invention. The replacement of these salts would be by adding of a small amount of conditioner which has been specially formulated to replace these consumed salts.

The electrolyte bath 10 of the present invention is to be primarily formulated of approximately sixty-nine percent phosphoric acid and twenty-five percent sulphuric acid. One of the purposes for the sulphuric acid is to achieve a polishing effect. Also, the sulphuric acid is to help to smooth the sharpened surfaces. To this combination of phosphoric and sulphuric acids there is to be added two grams per liter of chromic acid, five grams per liter of nickel carbonate and two-tenths gram per liter of ferric oxide. This bath is also to contain about six percent water. The use of the sulphuric acid, the water and the stabilizing salts (chromic acid, nickel carbonate and ferric oxide) enhances the phosphoric so that the bath is able to accommodate a broader spectrum of different types of alloys. It has been found that the bath 10 of the present invention is able to handle exotic metals such as Inconel, Hastalloy, as well as other types of exotic metals.

When a new tool is acquired, and is put to use, this tool has a sharp fragile edge. After just a couple of passes with the tool the sharpness of this edge will be slightly decreased to a working sharp edge. It has been found that the resharpening procedure of the present invention in essence resharpens tools to the level of this working edge.

It has been found that the time required to resharpen a cutting edge is no more than five to ten minutes. However, in some instances, the time can be increased to as high as twenty minutes. And still further, in certain instances, there may be required an increased amount of time if the part that is being sharpened is especially dull.

Using the bath of the present invention, the electro-chemical milling process of this invention removes grind marks on the surfaces of the cutting edge. This is desirable since these grinding marks will be transformed onto the work piece. When dealing with high tolerances, it is desirable to eliminate as much as possible these grinding marks. As a result, on the workpiece there is achieved an improved micro finish.

If a tool that is slightly dull is resharpened with the bath 10 of the present invention, the tool will be resharpened to achieve a super sharp finishing tool. If the tool that is being resharpened has a higher degree of dullness, it can be resharpened to a finishing tool. If the tool that is being resharpened was rather abused and not usable, it can be resharpened to at least a roughing stage tool.

Another objective of this invention is that tools can be resharpened frequently without leaving the working environment. This means that the tools are being used in a more highly sharpened state which improves the quality of the workpieces.

Also, the bath 10 of the present invention can be utilized to slightly reduce sizes of drills and reamers for special applications. In other words, in certain instances it may be desirable to slightly reduce the diameter of a drill or the reamer a few thousandths of an inch. The bath 10 of this invention can be utilized to achieve this end.

Referring particularly to the drawings there is shown a sheet material housing 12 which is of a size to be located on a bench or other similar type of supporting surface. This housing 12 includes an internal compartment 14. Within the compartment 14 is located an open topped container 16. The wall of the container 16 is electrically conductive. A desirable material of construction for the container 16 would be copper. Within the copper container 16 there is located a quantity of the previously discussed electrolyte bath 10.

Located in juxtaposition to the container 16 is a second container 18. Within the container 18 is located a rinsing bath 20 which will normally comprise water. The material of construction for the container 18 would be plastic or other similar type of material.

Immersed into the bath 10 is a metallic grid 22. This metallic grid 22 is of an open box-like configuration with the electrolyte bath 10 being constantly passing through the holes 24 of the grid 22. The grid 22 is in contact with the copper wall of the container 16. In essence, the container 16 as well as the grid 22 comprises a cathode. Electrical energy is to be supplied through the conductor 26 to the grid 22.

The anode comprises the tool 28 which is to be sharpened. Only the cutting edge of the tool 28 is to be submerged within the bath 10. The tool 28 is attached by an electrically conducting wire 30 to a rod 32. The rod 32 is mounted within slots 34 and 36 of the respective brackets 38 and 40. The brackets 38 and 40 are fixedly mounted onto the housing 12. The rod 32 can be adjusted within the confines of the slots 34 and 36 toward and away from the surface of the bath 10. The tool 28 is mounted so that only the desired sharpening edge of the tool 28 is submerged within the bath 10. The rod 32 is then fixed in position with respect to the brackets 38 and 40 by means of tightening knobs 42.

Electrical energy is to be supplied to the rod 32 by means of conductor 44. Conductors 44 and 26 connect to a source of electrical energy (not shown) mounted within the housing 12. It is envisioned that this source will be connected to a conventional one hundred ten volt source.

Mounted within the housing 12 is a potentiometer (not shown) which is capable of being adjusted by turning of knob 46. The observing of the amount of voltage is achieved by noting the position of needle 48 of voltmeter 50 which is mounted on housing 12. Also, mounted on the housing 12 directly adjacent the meter 50 is a an ammeter 52. The reading of the amperage is accomplished by knowing the position of needle 54. As by way of example, for a reading of four volts observed by needle 48, a common reading for needle 54 would be less than one ampere.

To apply electrical energy to the bath 10, it is only necessary to move switch 56 from the "off" position to the "on" position. Also mounted on the housing 12 is a counter 58. The counter 58 can be set to a predetermined number of minutes which would be the estimated amount of time that the tool 28 is to remain in the bath 10. At the end of that period of time, an annunciator will be operated such as a bell to denote to the user that it is time to remove the tool 28 from the bath 10 and to stop the electro-chemical milling process.

Once the tool 28 has been completely removed from the bath 10 there is normally not required any further steps prior to its usage.

What is claimed is:

1. A bath for electro-chemically resharpening of metallic cutting tools comprising:

an aqueous solution of phosphoric acid (approximately sixty-nine percent by volume) and sulphuric acid (approximately twenty-five percent by volume) to which is added stabilizers of chromic acid (approximately two grams per liter), nickel carbonate (approximately five grams per liter) and ferric oxide (approximately two-tenths gram per liter).

2. The method of electro-chemically resharpening of metallic cutting tools comprising the steps of:

providing a bath consisting of an aqueous solution of phosphoric acid, sulphuric acid, chromic acid, nickel carbonate and ferric oxide;

locating an electrode within the bath;

submersing into the bath the portion of a cutting tool that is to be resharpened; and applying an electrical potential between the electrode and the cutting tool for a limited period of time.

3. The method as defined in claim 2 wherein:

the step of applying includes maintaining the electrical potential between one-half volt to six volts.

4. The method as defined in claim 2 wherein:

the step of applying includes holding the period of time between one and twenty minutes.

5. The method as defined in claim 2 wherein:

the bath is utilized at approximately seventy-five degrees Fahrenheit.

* * * * *